July 9, 1935.  S. H. SMITH  2,007,775
METHOD OF MAKING AIRCRAFT PROPELLERS
Filed July 28, 1931
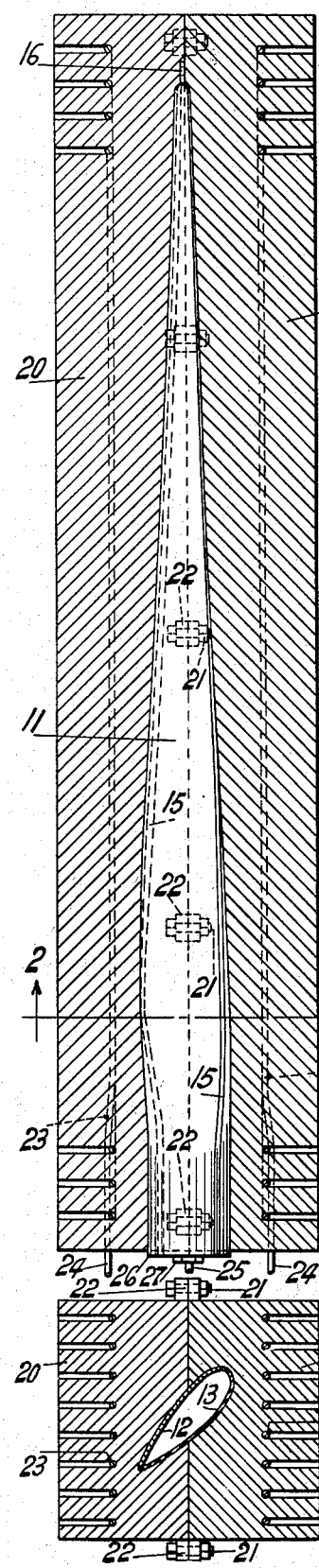
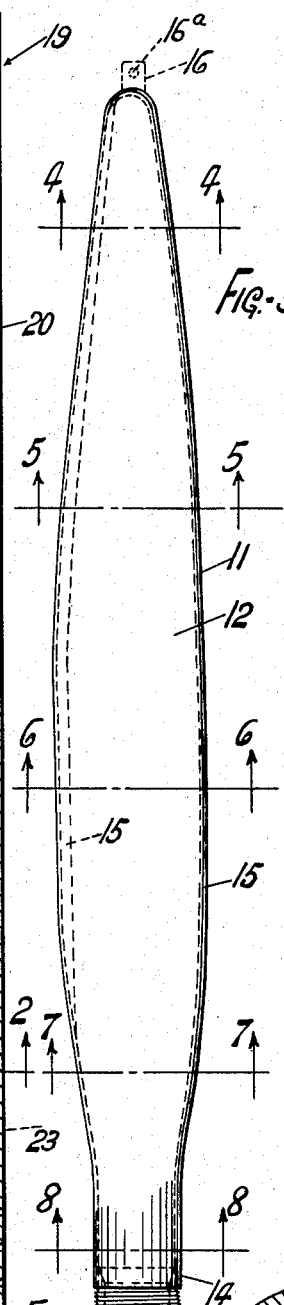
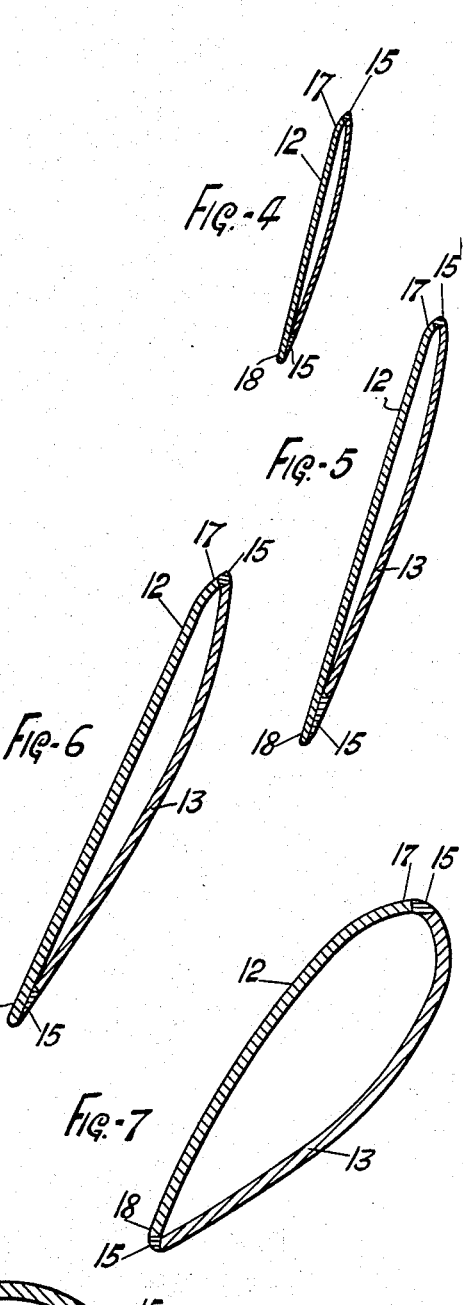
INVENTOR
SAMUEL H. SMITH
BY Ely & Barrows
ATTORNEYS Patented July 9, 1935

2,007,775

UNITED STATES PATENT OFFICE 2,007,775

METHOD OF MAKING AIRCRAFT PROPELLERS

Samuel H. Smith, Rocky River, Ohio, assignor, by mesne assignments, to Aviation Manufacturing Corporation, Chicago, Ill., a corporation of Delaware Application July 28, 1931, Serial No. 553,521

2 Claims. (Cl. 29—156.8)

This invention relates to air craft propellers, and more particularly, to the construction and method of making hollow metallic blades for such propellers.

An object is to provide means for the production of a hollow propeller blade which is formed from metallic blanks and possesses such strength as will avoid the necessity of employing interior braces or webs.

Another object is to provide means for overcoming and eliminating any flaws or defects in the metallic structure of the blade which are caused by excessive cold working.

While still another object is to provide means for manufacturing a propeller blade formed and aligned to a higher degree of precision and accuracy than in blades now in use.

In the drawing, in which the preferred and best known form of the invention is shown and described:

Fig. 1 is a longitudinal section of the shaping die showing the propeller mounted therein;

Fig. 2 is a section on the line 2—2 of Fig. 1;

Fig. 3 is an elevation view on the pressure face of the blade; and

Figs. 4, 5, 6, 7 and 8 are enlarged sections taken on lines 4—4, 5—5, 6—6, 7—7 and 8—8 respectively of Fig. 3.

I show my invention as applied to a propeller blade 11, comprising a pressure face or thrust face 12, and a suction face or camber member 13, both of said faces terminating in a tubular shank portion 14. The blade 11 is preferably formed from two rolled, tapered metallic blanks, not shown herein, which are first placed in dies where they are formed and cut to contour. The two cooperating portions of the blade are then held closely together in a jig, and are welded together by any suitable means.

In this case, the weld is indicated by the dotted lines in Figures 1 and 3, and is shown in section in Figures 4 through 8. The tip of the blade 11 is provided with a lug 16 having an aperture 16a, and serving a purpose hereinafter explained.

It will be noticed, by referring to sectional views 4 through 8, that the weld 15 at the leading edge 17, is positioned exactly at the point of intersection of the two blade faces and, in fact, forms the edge portion along the leading edge. Furthermore, that the weld 15, at the trailing edge 18, is positioned solely within the suction face 13 from the tip of the blade to substantially that part of the blade shown in Figure 7, from which point on to the end of the shank the weld is positioned at the point of intersection of the two faces and, in fact, forms the outside edge at the trailing edge 18.

After the blade has been shaped and the two sections have been welded together, the blade is suspended by the lug 16 on anchoring means in a heated furnace, with the aperture 16a of the lug 16 directly in line with the centers of gravity of the various cross sections of the blade, so that while the blade is still in a hot condition the heavier parts of the blade will tend to straighten the tip sections thereof.

The next step in the manufacture of the blade is provided in order to accurately align and precisely shape the blade, and to eliminate cause of flaws in the metal by eliminating cold working. A mold 19, having two corresponding sections 20, clamped together by aligned studs 21, cooperating with brackets 22, is provided with electric heating elements 23, connected by conductors 24, to a source of current. Any suitable heating means may be used to heat the mold 19, and it will be understood that I do not intend to limit my invention to the specific heating means shown herein.

The blade, which has been brought up to heat treating temperature in the furnace, is placed in the hot mold 19, which has been heated by the electric heating elements 23, and the two sections 20 of the mold are clamped tightly together by the studs 21.

While the temperature in the mold 19 is thus maintained at the proper temperature by the electric heating elements 23, compressed air is introduced into the interior of the blade 11, through the shank 14, by means of an air tube 25, connected to an air compressing means not shown herein, and secured to a closure member 26 by a nut 27.

To secure the best results, the temperature in the mold should be sufficiently high to cause the metal to be pliable and readily shaped, while the air pressure should be high enough to exceed the yield point of the metal at the parts requiring forming, and should be maintained long enough to insure permanent setting of the metal. This process of heating metal and introducing compressed air into the blade may be repeated several times, and when properly operated, will cause all parts of the blade to be properly formed and aligned.

From the foregoing, it will be apparent to those skilled in the art, that I have provided a method for manufacturing hollow metal propeller blades from blanks joined by welding, which is positioned where it will be subjected to a minimum stress and strain. Furthermore, it will be understood, that by heating the formed blade in a mold and introducing air pressure into the interior thereof, that great precision and accuracy of alignment and formation is secured, and the proper thickness of the material throughout the entire structure is assured.

At the same time it will be apparent to those skilled in the art, that my invention includes advantages, uses and adaptations other than those specifically pointed out or mentioned herein, and that my invention may be variously changed, used or modified, all without departing from the spirit of my invention or sacrificing the advantages thereof. It, therefore, will be understood that the embodiment of my invention herein set forth is illustrative only and my invention is not limited thereto.

What is claimed is:

1. A method of manufacturing an aircraft propeller blade from two metal blanks each forming a face of the blade, shaping said blanks into a single blade with a tubular open-ended shank, welding said blanks together by an inlaid metal weld between the contiguous edges of the blanks at the leading edge of the blade with the metal of the weld disposed to form the leading edge throughout the effective length of the blade, heating the blade to heat treating temperature, placing the heated blade in a heated mold, and introducing compressed air into said blade while the blade is thus heated and held in the mold for producing an accurately aligned blade.

2. A method of manufacturing an aircraft propeller blade from two metal blanks each forming a face of the blade, shaping said blanks into a single blade with a tubular open-ended shank, welding said blanks together by an inlaid metal weld between the contiguous edges of the blanks at the leading edge with the metal of the weld disposed to form the leading edge throughout the effective length of the blade and at the trailing edge positioned wholly within the suction face from the tip of the blade substantially to the inner end thereof and between the rear face of the blank forming the pressure face and the adjacent edge of the blank forming the suction face, heating the blade to heat treating temperature, placing the heated blade in a heated mold, and introducing compressed air into said blade while the blade is thus heated and held in the mold for producing an accurately aligned blade.

SAMUEL H. SMITH.